Patented Apr. 3, 1951

2,547,497

UNITED STATES PATENT OFFICE 2,547,497

REACTION PRODUCTS OF BIS-AZOLINES AND DIELS-ALDER ADDUCTS

Stanley P. Rowland, Philadelphia, Pa., assignor to Rohm & Haas Company, Philadelphia, Pa., a corporation of Delaware No Drawing. Application January 3, 1950,
Serial No. 136,647

12 Claims. (Cl. 260—101)

This invention relates to a new class of imido-esters and to a process for preparing them.

The products of this invention are resinous and often polymeric imido-esters of high molecular weight. They are made by reacting a bis-azoline; that is, a bis-oxazoline or a bis-thiazoline, with a Diels-Alder adduct of maleic anhydride and a member of the class consisting of rosin, esters of rosin, China-wood oil, and dehydrated castor oil.

The bis-azolines which react with the Diels-Alder adducts have the general formula

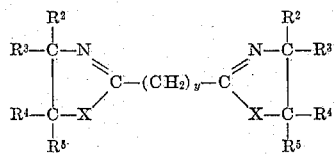

in which $y$ is an integer of value 4 to 8 inclusive; X represents an atom of oxygen or sulfur; and the characters, $R^2$, $R^3$, $R^4$ and $R^5$ represent hydrogen atoms or monovalent organic radicals which are unreactive with acid anhydrides and therefore are free of alcoholic hydroxyl groups and amino-hydrogen atoms and which preferably are hydrocarbon radicals. Reaction takes place between the bis-azolines and the anhydride groups which are present in the Diels-Alder adducts.

It is known that rosin and its esters, China-wood or tung oil, and dehydrated castor oil contain conjugated systems; that is, alternating arrangements of single bonds and two double bonds within the molecules of the materials. It is also known that maleic anhydride, like itaconic and citraconic anhydrides, reacts at the point of conjugation with these materials by so-called "1-4 addition" to form a "maleic adduct." The above are only a few of the many conjugated compounds which form such adducts and the preparation of the adducts is widely known as the "diene synthesis" which can be illustrated by the following schematic equation:

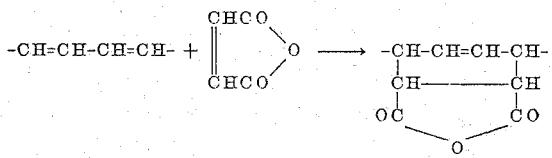

For a further understanding of the Diels-Alder reaction or the diene synthesis and of the formation of "maleic adducts," reference is made to "The Chemistry of Synthetic Resins" by Ellis (Reinhold Publishing Corporation, New York, N. Y. 1935), particularly chapter 40, the references therein and the subsequent literature.

It has now been found that the maleic-adducts of the Diels-Alder type react with bis-azolines to form an entirely new class of products, which are essentially polymeric imido-esters, according to the following schematic equation in which the anhydride portion of the Diels-Alder adduct is represented as

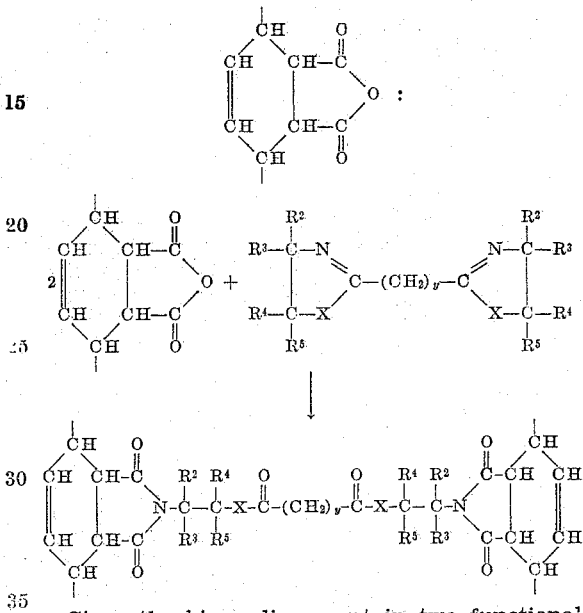

Since the bis-azolines contain two functional groups, they can react with two anhydride groups in an adduct as shown above.

A molecule of the tung oil adduct can contain up to three anhydride groups since tung oil is essentially the ester of one mole of glycerine and three moles of eleostearic acid each mole of which acid is in turn conjugated and which therefore forms an adduct with maleic anhydride. When only enough maleic anhydride is added to the tung oil so as to provide an average of one anhydride group in each molecule of oil adduct then one mole of bis-azoline, on reaction, joins two moles of the tung oil adduct together and the product is oil-like but contains imido groups which impart new chemical properties to the oil. When enough maleic anhydride is added to tung oil so as to provide up to two anhydride groups in each molecule of adduct then the oil attains a functionality up to two as far as reactivity with bis-azolines is concerned, and a bis-azoline which itself is bifunctional then reacts either with two anhydride groups in the same oil molecule or with one anhydride group in each of two molecules of oil. Both reactions take place and imido groups are thus introduced. Of further importance though is the fact that new polymers are produced when a molecule of the bifunctional bis-azoline reacts with anhydride groups in two different molecules of the bifunctional oil-adduct. These new products are very viscous, resinous fluids. It should also be pointed out that any free conjugated bonds in the oil molecules which are not reacted with maleic anhydride are still free to react in their customary way. Finally when the oil is reacted with enough maleic anhydride to introduce more than two anhydride groups into each oil molecule then the oil requires a functionality of over two (and up to three). When such an oil-adduct is reacted with bifunctional bis-azolines, cross-linking of the molecules occurs with the production of three-dimensional products which eventually become insoluble, rubbery masses.

What has been said about tung oil applies equally to dehydrated castor oil, which is an article of commerce and whose properties are due to its being a glyceryl ester of a conjugated acid (octadecadien-9,11-oic acid) which forms maleic anhydride adducts like those of the eleostearic acid in tung oil.

The Diels-Alder adducts of rosin are well known. The carboxyl group in rosin (which is essentially abietic acid) is readily neutralized with the formation of salts or esterified with the formation of esters. And the maleic anhydride-adducts of these rosin salts and rosin esters are well known. Of necessity they contain an anhydride group in each molecule of the rosin nucleus which group reacts with bis-azolines by the process of this invention. When the bis-azolines are reacted with (a) the adduct of rosin or (b) the adducts of the salts of rosin or (c) the adducts of the simple esters of rosin and monohydric alcohols such as methanol or ethanol, the reaction follows the course shown above in the general equation and two moles of the adduct become joined by an imido-ester linkage. Such products can be considered as dimers or as bis-imido-esters.

When, however, the rosin-adduct is the ester of a glycol such as ethylene glycol, polyethylene glycol, hexamethylene glycol and the like, it becomes evident that each molecule of the ester-adduct has two anhydride groups which imparts to it a functionality of two, for purposes of this invention. Two anhydride groups in a molecule of ester-adduct react with one molecule of bis-azoline since there are two functional groups in each molecule of the latter. Thus one molecule of bis-azoline reacts with the two anhydride groups in the same molecule of glycol-ester-adduct or with one anhydride group in each of two molecules of ester-adduct. As a result of the latter reaction there are produced linear polymers which have high molecular weights but which nevertheless are thermoplastic. Thus the reaction between bifunctional bis-azolines and bifunctional glycol esters of rosin has a certain resemblance to those reactions between dicarboxylic acids and dihydric alcohols since both reactions lead to the formation of long-chain thermoplastic polymers.

Finally, when a bis-azoline reacts with an ester of rosin and a polyhydric alcohol containing more than two hydroxyl groups, e. g. estergum, the product is three-dimensional and thermosetting. Thus when the maleic anhydride-adducts of rosin esters of glycerol, pentaerythritol, mannitol, sorbitol and the like are reacted with bis-azolines by the process of this invention, the products of reaction become insoluble and infusible. This is because the bifunctional bis-azoline serves as a cross-linking agent between the anhydride groups in the polyfunctional ester of rosin. Thus each molecule of bis-azoline reacts with two anhydride groups within the same molecule of rosin ester or with an anhydride group in each of two molecules of rosin ester. Actually both kinds of reactions, i. e. inter- and intra-molecular reactions, can and do take place with the result that a three-dimensional polymer is formed, which, like other three-dimensional resins, is thermosetting in character.

The bis-oxazolines and bis-thiazolines which react with the Diels-Alder adducts by the process of this invention are those which have the general formula given above. It is to be noted that the groups represented by $R^2$, $R^3$, $R^4$, $R^5$ and X, as well as the value of $y$, are not altered by the reaction with the adducts. That is, they remain intact during the reaction between the adduct and the bis-azoline.

So that no interfering side-reactions can take place, it is necessary that the organic radicals which are represented by the R's be unreactive with acid anhydrides. Thus, they must be free of such substituents as hydroxyl groups and amino-hydrogen atoms. Whether or not a particular substituent is reactive with acid anhydrides is well within the knowledge of one skilled in chemistry. It is much preferred that the radicals which are represented by the R's be hydrocarbon radicals such as alkyl, aryl, aralkyl, alkaryl and cycloalkyl. The following list includes examples of such suitable, hydrocarbon radicals: methyl, ethyl, isopropyl, sec.-butyl, tert.-butyl, 2-ethylhexyl, lauryl, n-tetradecyl, and octadecyl groups and the isomers of these groups; phenyl, tolyl, benzyl, p-octylphenyl, m-xylyl, 2,4-di-tert.-amylphenyl, cyclohexyl and naphthyl groups.

Although those bis-azolines are preferred in which the substituents represented by the R's are hydrocarbon radicals, it is a fact that the maleic adducts react readily and satisfactorily with bis-azolines in which the substituents $R's^2$ to $^5$, also contain other elements in addition to carbon and hydrogen. Thus, halogen groups may be present as well as nitro, ether, keto, aldehydo, sulfuric, and tertiary amine groups. None of these groups reacts with the acid anhydrides and none interferes with the reaction of the maleic-adduct with the bis-oxazolines or bis-thiazolines.

The reaction between the bis-azolines and the adducts takes place readily. Reaction occurs even at room temperature (ca. 20° C.) especially when an adduct and a bis-azoline are dissolved in a volatile solvent and are deposited as a thin film. Thus, for example, a 75% solution in xylene of one molar equivalent amount of 1,8-octamethylene-bis-2-(5-methyloxazoline) and one molar equivalent amount of the adduct of ethylene glycol dirosinate and maleic anhydride increased in 60 hours at room temperature from an original viscosity of 3 poises to a viscosity of 8.8 poises. Heating of the reactants accelerates the rate of reaction and for this reason a minimum temperature of 50° C. is recommended. Temperatures up to 300° C. are operable but an upper temperature of 250° C. is much preferred. It has also been found that in general it is advantageous to maintain as low a temperature of reaction as is feasible when the bis-azoline carries two substituents, such as alkyl groups, in the positions occupied by $R^4$ and $R^5$ in the general formula above. In such cases a maximum temperature of about 150° C. is suggested. When the resinous product is to be isolated in bulk, the reactants are combined in a reactor; but this is not always necessary. For example, a solution of a mixture of reactants, particularly a combination which yields insoluble products, can be applied to an object which it is desired to coat and protect, and then the coated object can be baked in an oven. During the baking period, the reactants combine to form the new polymeric product as a firm coating on the object. Furthermore, mixtures of adducts and bis-azolines which react to form insoluble products can be blended with customary fillers, pigments and the like and molded directly under heat and pressure in a closed mold. This method of reacting and molding at the same time is quite satisfactory because no volatile product, such as water, is liberated by the reaction of the adduct and the bis-azoline.

For convenience, inert solvents can be employed. Likewise, catalysts such as alcoholates, zinc chloride and the like can be used, although ordinarily the reaction takes place rapidly enough in the absence of catalysts. Other expedients well known to those skilled in the art, such as variations in pressure, solvent extraction of the product, excess of one reactant, and the like, can be used without departing from the spirit of this invention which is one of preparing new resinous imido-esters by combining bis-oxazolines or bis-thiazolines as herein defined with the adducts of maleic anhydride and tung oil, dehydrated castor oil, rosin and the salts and esters of rosin.

It is evident from the above discussion that one molar equivalent weight of bis-azoline can combine with two anhydride groups in the rosin- or oil-adducts. The course of the reaction therefore is readily followed by titrating the reaction mixture with standard alkali since the alkali neutralizes the free and unreacted anhydride groups in the adduct.

While the reactants can combine in the ratio of two molar equivalent weights of the adduct to one of the bis-azoline it is evident that a higher ratio of either can be employed. When an excess of bis-azoline is present only one azoline ring—i. e., one functional group—will react but the products will nevertheless be new and distinctive imido-esters. In some instances, such as in the case of the glyceryl or pentaerythritol esters of rosin-maleic adduct, a small amount of reacted bis-azoline provides sufficient cross-links as to cause gelation or insolubilization. In those instances where it is desirable to employ less than enough bis-azoline to react with all of the anhydride groups in the adduct, the unreacted anhydride groups can be readily converted to salts for example by neutralization, or to esters by reaction with alcohols. Alternatively, some of the anhydride groups can be neutralized or esterified first, and the remainder then reacted with the bis-azoline.

The following examples are presented in order to illustrate—and not to limit—this invention. The reaction of the bis-oxazolines and bis-thiazolines with the maleic adducts of tung oil, dehydrated castor oil, rosin and rosin salts and esters is ordinarily complete after about two to four hours of heating at about 125° C. to about 200° C. This new reaction provides a large class of new products which are actually all imido-esters but which differ from one another as to the particular adduct, as regards to the amount of maleic anhydride in the adduct, as regards the number of methylene groups joining the two azoline rings, and finally as regards the substituents, $R's^{2\ to\ 5}$, on the bis-azoline. All of the bis-azolines and maleic anhydride-adducts described herein, however, react by the same mechanism; and their reactions are typified by the following examples:

*Example 1*

A Diels-Alder adduct of China-wood oil was made by reacting 1 mole of China-wood oil with 3 moles of maleic anhydride for 30 minutes at 150° C., then for 30 minutes at 200° C. and finally for 30 minutes at 250° C. The adduct was a clear, viscous oil. One part of this adduct was mixed with 0.358 part of 1,8-octamethylene-bis-2-(5-methyloxazoline) by heating and stirring the mixture in a flask and under a blanket of carbon dioxide for one hour at 100° C. The product was a viscous oil which dried rapidly when applied as a film. Such a film became tack-free in two hours and had a pencil hardness of B on drying overnight. In comparison a film of the adduct alone remained tacky for at least 24 hours. While the addition of cobalt drier (0.05% cobalt metal as naphthenate) had no appreciable effect on the rate of drying of the imido-ester product as made above, it did cause the unreacted adduct to dry more rapidly. However, the adduct containing the drier was much softer (pencil hardness of 6B) after 24 hours of drying than the imido-ester without drier.

Essentially the same kind of rapid-drying product was obtained by reacting in the same way the China-wood oil-adduct and the following bis-azolines: 1,4-tetramethylene-bis-2-(5-methyloxazoline; 1,8 - octamethylene - bis-2-(5-methylthiazoline); 1,6 - hexamethylene - bis - 2-(4,5 - dimethyloxazoline); 1,6 - hexamethylene-bis-2-(4,5 - dimethylthiazoline); and 1,8 - octamethylene-bis-2-(5-phenyloxazoline).

In a further test, an identical mixture of the China-wood adduct and 1,8-octamethylene-bis-2-(5-methyloxazoline) as described above was held at room temperature for only one hour and was then applied as thin films on glass plates. The films air-dried rapidly, were tack-free in about two hours and were hard overnight, with or without cobalt drier.

*Example 2*

An adduct was prepared from one mole of China-wood oil and one of maleic anhydride by reaction under a blanket of nitrogen at 250° C. The adduct was then combined with 1,4-tetramethylene - bis - 2 - (5 - methyloxazoline) in the weight ratio of 1 to 0.44 and the mixture was held at 200° C. for 2 hours (again under nitrogen). The product was a clear, moderately viscous, reactive oil which exhibited superior properties as a drying oil alone and in varnishes as compared with the unmodified oil-adduct.

*Example 3*

A Diels-Alder adduct of dehydrated castor oil was prepared by heating for three hours at 275°–285° C. one mole of commercially available dehydrated castor oil and 2.6 moles of maleic anhydride. This adduct was then converted to the imido-ester by reacting 0.1 mole (114 g.) of it with 0.13 mole (36.5 g.) of 1,8-octamethylene-bis-2-(5-methyloxazoline) under an atmosphere of carbon dioxide at 175° C. for one hour. The product, a viscous oil, had air-drying properties, even in the absence of drier. A film of the product when baked for one hour at 150° C. was harder and had greater solvent-resistance than a similarly baked film of the unreacted adduct.

The reaction of the adduct of dehydrated castor oil with the bis-azolines at temperatures above about 125° C. is rapid as shown by a fast reduction in the acid number of the reaction mixture. Very similar products to that above were obtained by reacting in the same way the dehydrated castor-oil adduct with these bis-azolines: 1,4 - tetramethylene - bis - 2 - (5 - methylthiazoline); 1,6 - hexamethylene - bis - 2 - (5-p-chlorophenyloxazoline); 1,4-tetramethylene-bis-2-(4-methyl-5-hexyloxazoline); and 1,7-heptamethylene - bis - 2 - (4 - methyl - 5 - ethyloxazoline).

Example 4

The adduct of 1.9 moles of maleic anhydride with one mole of dehydrated castor oil was combined with 24.7 g. of 1,7-heptamethylene-bis-2-(5-methyloxazoline) for every 100 g. of adduct. The mixture was heated to 150°–155° C. (in an inert atmosphere of carbon dioxide) and maintained at this temperature for 4 hours. The product was an extremely viscous, rapid-drying composition. It was compatible with varnish resins.

Example 5

A Diels-Alder adduct of rosin was prepared by mixing and heating 0.9 mole of maleic anhydride and 1 mole of rosin at 200° C. for 30 minutes. The product had an acid-number of approximately 400 and was a hard resin having the general appearance of rosin itself. A mixture of 387 parts of this rosin-adduct and 100 parts of 1,4-tetramethylene-bis-2-(5-methyloxazoline) was heated and stirred for three hours at 180° C. under carbon dioxide. The product was a clear, hard, brittle resin which was soluble in xylene, butyl Cellosolve, ethanol and methyl isobutyl ketone. Its acid number was 139, as against a calculated acid number of 115 for a completely reacted product.

In an identical manner, 1,8-octamethylene-bis-2-(5-methylthiazoline) was reacted with the rosin-adduct. The product had the same general appearance and solubility-characteristics as the bis-oxazoline product and an acid number of 128.

Example 6

A Diels-Alder adduct of methyl abietate was prepared by heating 0.9 mole of maleic anhydride and 1 mole of the methyl ester of rosin for 90 minutes at 200° C. The product was a viscous, acidic, resinous fluid. A mixture of 300 parts of this adduct and 93.3 parts of 1,8-octamethylene-bis-2-(5-methyloxazoline) was stirred and heated for three hours at 180° C. under an atmosphere of carbon dioxide. The product was a clear, soft, sticky solid which was soluble in ethanol, butyl Cellosolve and methyl isobutyl ketone and which had an acid number of 3.1

Example 7

A Diels-Alder adduct of the ethylene glycol ester of rosin was made by heating 1.9 moles of maleic anhydride with 1.0 mole of the ethylene glycol ester of rosin for 30 minutes at 200° C. The resultant adduct was a hard resin. A mixture of 323 parts of this adduct and 100 parts of 1,7-heptamethylene-bis-2-(5-methyloxazoline) was stirred and heated under a blanket of nitrogen for three hours at 180° C. The product was a clear, hard, brittle resin which had an acid number of 1.0 and which was thermoplastic and soluble in xylene, ethanol, methyl isobutyl ketone and butyl cellosolve. Its viscosity was 2.5 poises when measured as a 60% solution in xylene at 25° C. as against a viscosity of 0.35 poise for a similar solution of the adduct.

Example 8

A Diels-Alder adduct of estergum (glyceryl ester of rosin) was made by heating for 30 minutes at 200° C. 2.7 moles of maleic anhydride with 1 mole of estergum, which had an acid number of 5. The product was a hard, brittle resin. A mixture of 42.8 parts of this resin and 10.0 parts of 1,7-heptamethylene-bis-2-(5-methyloxazoline) was fused and mixed in a large test tube and then heated for three hours at 180° C. The product was a clear, hard, brittle resin which was insoluble in xylene, ethanol, methyl isobutyl ketone, butyl Cellosolve, mineral spirits and vegetable oils.

In the same manner as is described immediately above, the adduct of estergum was reacted with other bis-azolines and in every case the product was an insoluble, gelled material by virtue of the cross-linking of the soluble, fusible estergum-adduct by the bis-azoline. Bis-azolines which reacted and caused gelation and insolubilization were 1,4-tetramethylene-bis-2-(5-methylthiazoline); 1,8 - octamethylene-bis-2-(5-phenylthiazoline); 1,6 - hexamethylene-bis-2-(5-p-nitrophenyloxazoline); 1,4-tetramethylene-bis-2-(4,5-dimethyloxazoline); 1,7-heptamethylene-bis-2 -(4,5 - diethyloxazoline); 1,5-pentamethylene-bis(4,4,5-trimethyloxazoline); 1,8-octamethylene-bis-2-(5-isobutyloxazoline).

It is apparent that the products of Example 8 are insoluble materials and that ordinarily one would not prepare them en masse or in bulk. The reaction which results in insoluble products, however, can be used to advantage in preparing molded objects by conducting the reaction of the bis-azoline and, for example, the estergum-adduct in a heated mold of desired shape. Also a solution of a mixture of bis-azoline and estergum-adduct can be applied to the surface of an object which it is desired to coat and the object can be heated, as for example in an oven, and the reactive mixture thus converted chemically into an insoluble coating on the object.

The products of this invention are all imido-esters which, therefore, have unusual chemical configurations which make them valuable as intermediates for the production of other new compounds. In their own rights, the products, which range from viscous fluids to hard, insoluble solids, have a wide variety of uses. Thus they are eminently suited as additives for lubricating oils, as plasticizers for synthetic resins and plastics, as modifiers for other surface-coating materials, and as film-forming and molding compositions themselves.

I claim:

1. A process for the preparation of new imido-esters, which comprises chemically combining, at a temperature from 20° C. to 300° C., (1) a Diels-Alder adduct of maleic anhydride and a member of the class consisting of rosin, salts of rosin, esters of rosin, tung oil and dehydrated castor oil with (2) a bis-azoline of the general formula

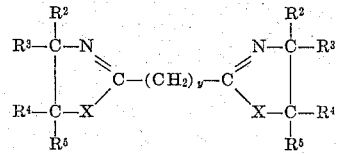

in which $y$ is an integer of value 4 to 8 inclusive; X represents an atom of an element from the class consisting of oxygen and sulfur; $R^2$, $R^3$, $R^4$, and $R^5$ represent members of the class consisting of hydrogen atoms and alkyl, aryl, aralkyl, alkaryl, and cycloalkyl groups.

2. A process for the preparation of imido-esters, which comprises chemically combining, at a temperature from 20° C. to 250° C. a Diels-Alder adduct of rosin and maleic anhydride with 1,4-tetramethylene-bis-2-(5-methyloxazoline).

3. A process for the preparation of imido-esters, which comprises chemically combining, at a temperature from 20° C. to 250° C. a Diels-Alder adduct of estergum and maleic anhydride with 1,4-tetramethylene-bis-2-(5-methyloxazoline).

4. A process for the preparation of imido-esters, which comprises chemically combining at a temperature from 20° C. to 250° C., 1,4-tetramethylene-bis-2-(5-methyloxazoline) with a Diels-Alder adduct of maleic anhydride and an ester of rosin and ethylene glycol.

5. A process for the preparation of imido-esters, which comprises chemically combining at a temperature of 20° C. to 250° C., a Diels-Alder adduct of tung oil and maleic anhydride with 1,4-tetramethylene-bis-2-(5-methyloxazoline).

6. A process for the preparation of imido-esters, which comprises chemically combining at a temperature of 20° C. to 250° C., a Diels-Alder adduct of dehydrated castor oil and maleic anhydride with 1,4-tetramethylene-bis-2-(5-methyloxazoline).

7. New compositions of matter as prepared by the process of claim 1.

8. New compositions of matter as prepared by the process of claim 2.

9. New compositions of matter as prepared by the process of claim 3.

10. New compositions of matter as prepared by the process of claim 4.

11. New compositions of matter as prepared by the process of claim 5.

12. New compositions of matter as prepared by the process of claim 6.

STANLEY P. ROWLAND.

No references cited.